United States Patent
Hamada et al.

(10) Patent No.: US 10,864,699 B2
(45) Date of Patent: Dec. 15, 2020

(54) COMPOSITE MATERIAL MEMBER, METHOD FOR PRODUCING COMPOSITE MATERIAL MEMBER, AND MOLDING DIE FOR SAME

(71) Applicant: Nissan Motor Co., Ltd., Yokohama (JP)

(72) Inventors: Yukihiro Hamada, Kanagawa (JP); Hiroshi Ookubo, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 16/484,855

(22) PCT Filed: Mar. 10, 2017

(86) PCT No.: PCT/JP2017/009740
§ 371 (c)(1),
(2) Date: Aug. 9, 2019

(87) PCT Pub. No.: WO2018/163411
PCT Pub. Date: Sep. 13, 2018

(65) Prior Publication Data
US 2020/0055273 A1    Feb. 20, 2020

(51) Int. Cl.
| | | |
|---|---|---|
| B32B 3/24 | (2006.01) | |
| B32B 5/12 | (2006.01) | |
| B32B 7/022 | (2019.01) | |
| B29C 70/48 | (2006.01) | |
| B29C 70/54 | (2006.01) | |
| B32B 3/26 | (2006.01) | |
| B32B 5/02 | (2006.01) | |
| B32B 5/14 | (2006.01) | |

(52) U.S. Cl.
CPC ............ B32B 5/12 (2013.01); B29C 70/48 (2013.01); B29C 70/545 (2013.01); B32B 3/266 (2013.01); B32B 5/024 (2013.01); B32B 7/022 (2019.01); B32B 5/145 (2013.01); B32B 2250/20 (2013.01); Y10T 428/24273 (2015.01); Y10T 428/24322 (2015.01)

(58) Field of Classification Search
CPC   B32B 3/266; B32B 5/12; B32B 5/145; B32B 2250/20; Y10T 428/24273; Y10T 428/24322
USPC .................................................. 428/131, 137
See application file for complete search history.

(56) References Cited

U.S. PATENT DOCUMENTS

| | | | | |
|---|---|---|---|---|
| 2016/0045961 | A1* | 2/2016 | Umehara | B32B 15/08 428/596 |
| 2017/0129207 | A1* | 5/2017 | Hallander | B82Y 30/00 |
| 2020/0262177 | A1* | 8/2020 | Kamo | B32B 7/02 |

FOREIGN PATENT DOCUMENTS

| | | |
|---|---|---|
| CN | 1741896 A | 3/2006 |
| CN | 101313637 A | 11/2008 |

(Continued)

*Primary Examiner* — William P Watkins, III
(74) *Attorney, Agent, or Firm* — Global IP Counselors, LLP

(57) ABSTRACT

A composite material member having an FRP layer made of fiber-reinforced plastic, and a resin-rich layer that has a fiber content that is 5% or less of the fiber content of the FRP layer. The resin-rich layer is formed in at least a partial region of a surface of the FRP layer, and is formed from the same resin as a matrix resin of the fiber-reinforced plastic. A hole is bored so as to penetrate the FRP layer and the resin-rich layer.

4 Claims, 12 Drawing Sheets

(56) References Cited

FOREIGN PATENT DOCUMENTS

| | | |
|---|---|---|
| JP | 1-228797 A | 9/1989 |
| JP | 3-31113 U | 3/1991 |
| JP | 2000-351857 A | 12/2000 |
| JP | 2002-322588 A | 11/2002 |
| JP | 2004-338271 A | 12/2004 |
| JP | 2009-23163 A | 2/2009 |
| JP | 2009-231222 A | 10/2009 |
| JP | 2015-160393 A | 9/2015 |
| JP | 2016-28838 A | 3/2016 |
| JP | 2016-114139 A | 6/2016 |
| WO | 2014/157570 A1 | 10/2014 |

\* cited by examiner

COMPOSITE MATERIAL MEMBER, METHOD FOR PRODUCING COMPOSITE MATERIAL MEMBER, AND MOLDING DIE FOR SAME

CROSS-REFERENCE TO RELATED APPLICATIONS

This application is a U.S. national stage application of International Application No. PCT/JP2017/009740, filed on Mar. 10, 2017.

BACKGROUND

Technical Field

The present invention relates to a composite material member, a method for producing a composite material member, and a molding die for the same.

Background Information

Conventionally, when an object to be fastened is fastened to a member made of fiber-reinforced plastic (hereinafter referred to as FRP member), a method is performed in which a hole is bored in the FRP member, a fastener is inserted in the hole, and the FRP member and the object to be fastened are fastened by the inserted fastener. Japanese Laid-Open Patent Application No. 2016-114139 discloses a related technique.

SUMMARY

When the FRP member is subjected to the boring process, there are cases in which peeling of the reinforcing fibers or loss of resin occurs in the periphery of the hole, and this peeling, etc., of the reinforcing fibers in the periphery of the hole may cause cracks in the fastening portion of the FRP member.

An object of the present invention is to suppress the occurrence of peeling of the reinforcing fiber and the loss of resin accompanying the boring process in a composite material member, such as the FRP member.

One aspect of the present invention is a composite material member in which a resin-rich layer, having a lower fiber content than an FRP layer, is formed in at least a partial region of a surface of the FRP layer, and a hole is bored so as to penetrate the FRP layer and the resin-rich layer. By means of the above-described composite material member, it is possible to suppress the occurrence of peeling of the reinforcing fiber and the loss of the resin accompanying the boring process.

DETAILED DESCRIPTION OF THE EMBODIMENTS

Composite material members (hereinafter referred to as member CM) according to several embodiments will be described below with reference to the drawings. Terms that represent directions, such as "up" and "down," in the description below are defined for the sake of convenience in order to describe the positional relationship of each part, and do not limit the actual attachment attitudes, etc.

First Embodiment

Figure 1A:
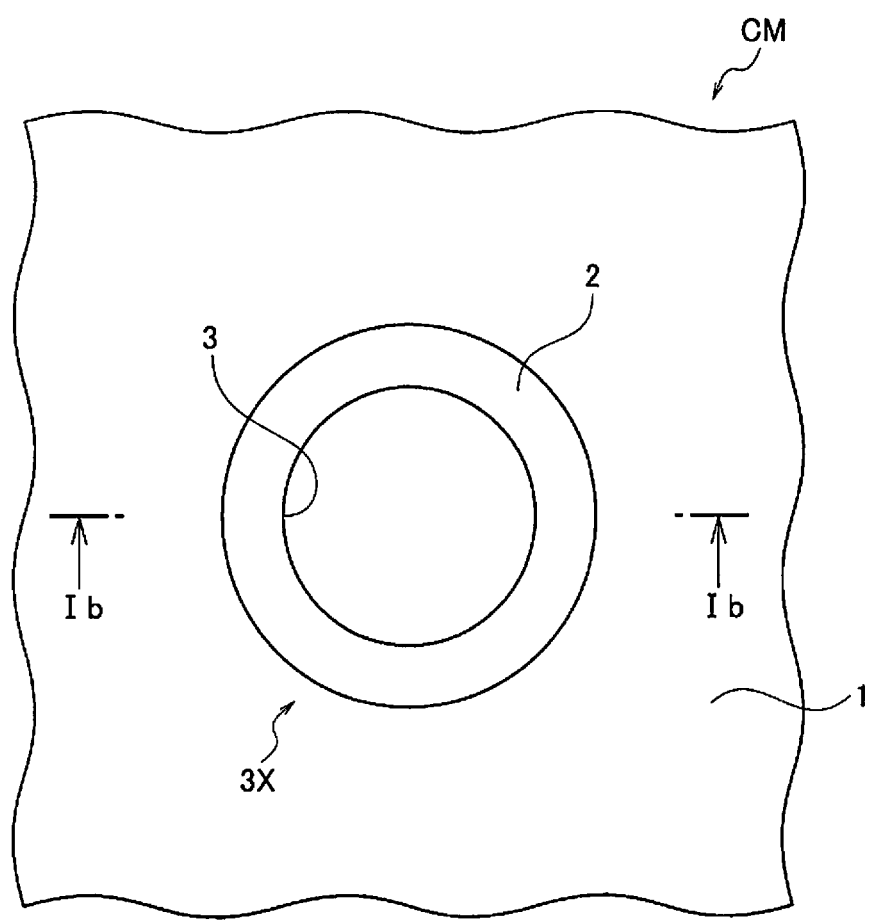
FIG. 1A is a top view of a composite material member according to a first embodiment, illustrating a state before a collar and a washer are attached.
Figure 1B:
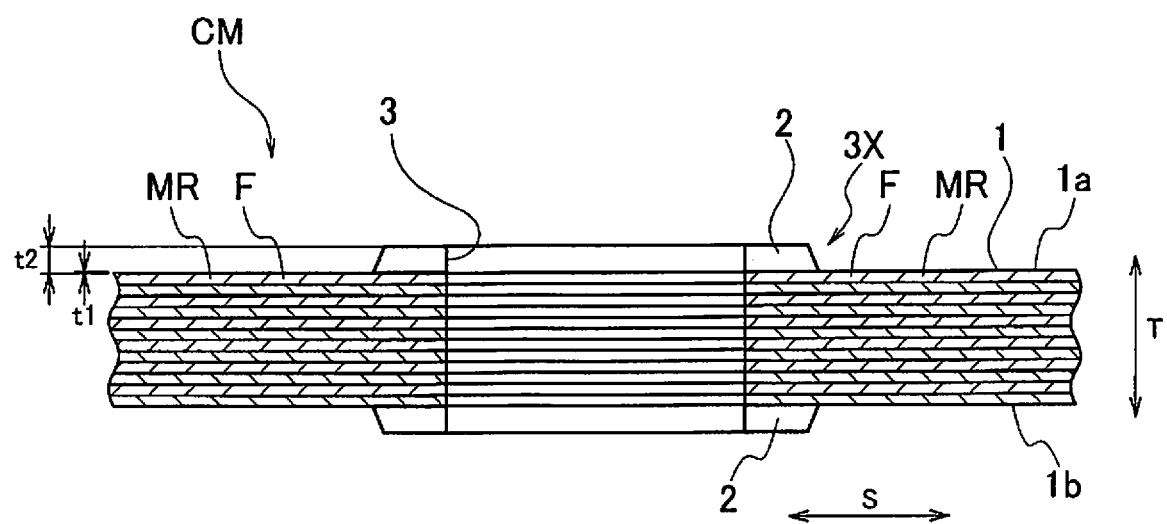
FIG. 1B is a cross-sectional view through line Ib-Ib in FIG. 1A.
Figure 2:
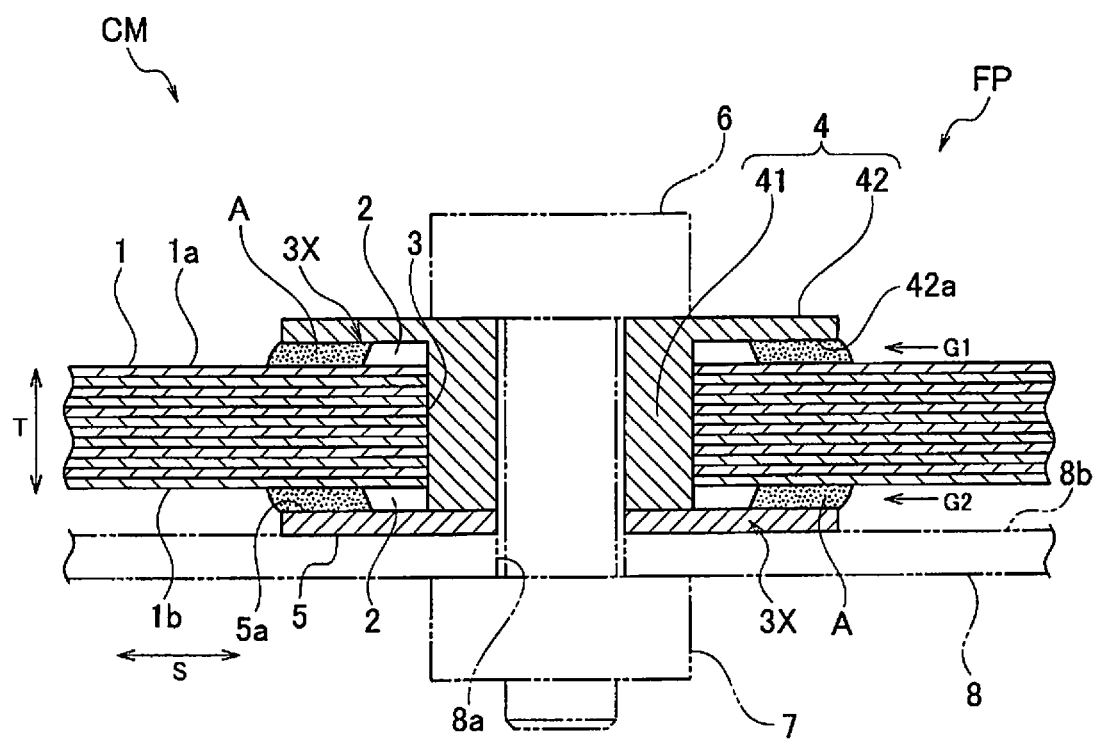
FIG. 2 is a cross-sectional view of the composite material member according to the first embodiment.

As illustrated in FIGS. 1A, 1B and 2, a member CM according to the first embodiment comprises an FRP layer 1, a resin-rich layer 2 formed on an upper side surface 1a of the FRP layer 1, a resin-rich layer 2 formed on a lower side surface 1b of the FRP layer 1, and a hole 3 formed in a thickness direction T of the member CM. The illustrated member CM is formed in a flat plate shape, but the shape thereof can be appropriately selected in accordance with the purpose, such as a curved plate shape.

The FRP layer 1 is made of fiber-reinforced plastic, mainly composed of reinforcing fibers F and matrix resin MR. The reinforcing fibers F are made of continuous fibers oriented along a planar direction S of the member CM, having, for example, a stacked structure in which reinforcing fiber bundles are stacked in one direction or at different angles, or a form of a woven fabric. The thickness of the FRP layer 1 is not particularly limited, and can be appropriately set in accordance with the required strength, rigidity, etc., of the member CM.

The reinforcing fibers F are not particularly limited; for example, carbon fiber, glass fiber, polyalamide fiber, alumina fiber, silicon carbide fiber, boron fiber, and carborundum fiber can be used. For example, polyacrylonitrile (PAN type), pitch type, cellulose type, vapor grown carbon fiber by hydrocarbon, graphite fiber, and the like, may be used as the carbon fiber. Two or more types of these fibers may be used in combination as well.

The matrix resin MR is not particularly limited; for example, well-known thermosetting resins and thermoplastic resins, such as epoxy resin, phenol resin, unsaturated polyester resin, vinyl ester resin, polyimide resin, polycarbonate resin, polyamide resin, and polyphenylene sulfide (PPS) resin can be used.

The FRP layer 1 may contain various additives, such as colorants and fillers, as components other than the reinforcing fibers F and the matrix resin MR.

The resin-rich layer 2 is mainly composed of the well-known thermosetting resin and thermoplastic resin exemplified above as the material for the matrix resin MR. The main component resin of the resin-rich layer 2 may be the same resin as the matrix resin MR, a different resin, or a mixture thereof. Like the FRP layer 1, the resin-rich layer 2 may contain reinforcing fibers and various additives as components other than the main component resin.

The resin-rich layer 2 has a lower fiber content than the fiber content of the FRP layer 1. The fiber content of the FRP layer 1 is the volume ratio of the reinforcing fibers F contained in the FRP layer 1 relative to the entire FRP layer 1, and the fiber content of the resin-rich layer 2 is the volume ratio of the reinforcing fibers contained in the resin-rich layer 2 relative to the entire resin-rich layer 2.

The hole 3 is formed so as to penetrate the FRP layer 1 and the resin-rich layers 2 formed on the surfaces 1a, 1b on both sides thereof. As illustrated in FIG. 2, a collar 4 is attached to the hole 3. The collar 4 has a tubular portion 41 and a flange 42, and the tubular portion 41 is inserted into the hole 3. The flange 42 is bonded to the FRP layer 1 by an adhesive A provided in a gap G1 between a rear surface 42a thereof and the surface 1a of the FRP layer 1. The resin-rich layer 2 on the upper side is interposed between the surface 1a of the FRP layer 1 and the rear surface 42a of the flange 42 in a state in which the front surface thereof is in contact with the rear surface 42a of the flange 42, prescribing the size of the gap G1.

In addition, a metal washer 5 is provided on the lower side surface 1b of the FRP layer 1. The washer 5 is bonded to the FRP layer 1 by the adhesive A provided in a gap G2 between a rear surface 5a thereof and the surface 1b of the FRP layer 1. The resin-rich layer 2 on the lower side is interposed between the surface 1b of the FRP layer 1 and the rear surface 5a of the washer 5 in a state in which the front surface thereof is in contact with the rear surface 5a of the washer 5, prescribing the size of the gap G2. The adhesive A is not particularly limited\; for example, well-known adhesives, such as epoxy, can be used.

A peripheral portion 3X of the hole 3 constitutes a fastening portion FP of the member CM, together with the collar 4 and the washer 5. The fastening portion FP is fastened to an object to be fastened 8 by a fastener (for example, a bolt 6 and a nut 7) that is inserted in the tubular portion 41 of the collar 4. In the present embodiment, it is possible to fasten the member CM and the object to be fastened 8 by superposing the object to be fastened 8 on the washer 5, inserting the bolt 6 in the tubular portion 41 of the collar 4 and a hole 8a of the object to be fastened 8, and tightening the nut 7 on the bolt 6. It is also possible to omit the washer 5 and fasten the member CM and the object to be fastened 8 in a state in which an upper surface 8b of the object to be fastened 8 is brought into contact with a distal end of the tubular portion 41 of the collar 4, or, in a state in which the upper surface 8b of the object to be fastened 8 is brought into contact with the surface 1b of the FRP layer 1.

The action and effect of the present embodiment will be described below.

Figure 3A:
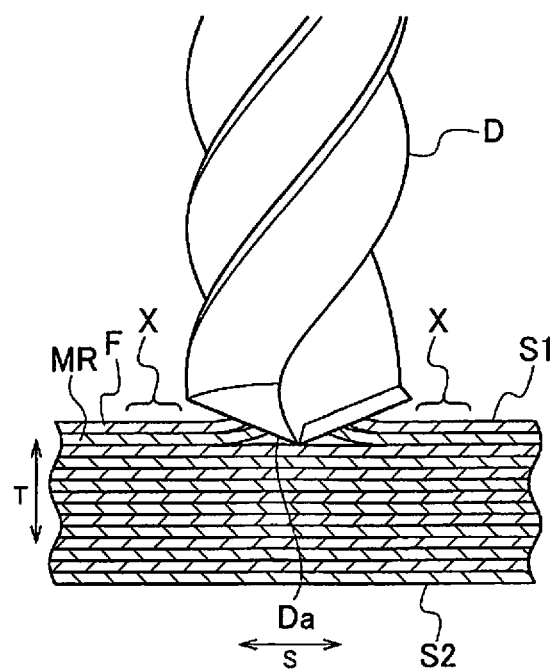
FIG. 3A illustrates a state in which a common FRP member is subjected to a boring process with a drill.

In general, a drill, an end mill, a water jet, or the like, is used for the boring process of an FRP member. As illustrated in FIG. 3A, in the boring process by a drill, first, a drill tip Da is made to enter a drill entry side surface S1. At this time, the rotational force of the drill D may act on the reinforcing fibers F in the outermost layer of the hole peripheral portion X from the drill tip Da in a direction to peel off the reinforcing fibers F (mainly the planar direction S). As a result, when the force that is generated between the reinforcing fibers F exceeds the adhesive force between the reinforcing fibers F, peeling of the reinforcing fibers or loss of resin could occur in the hole peripheral portion X of the surface S1.

Figure 3B:
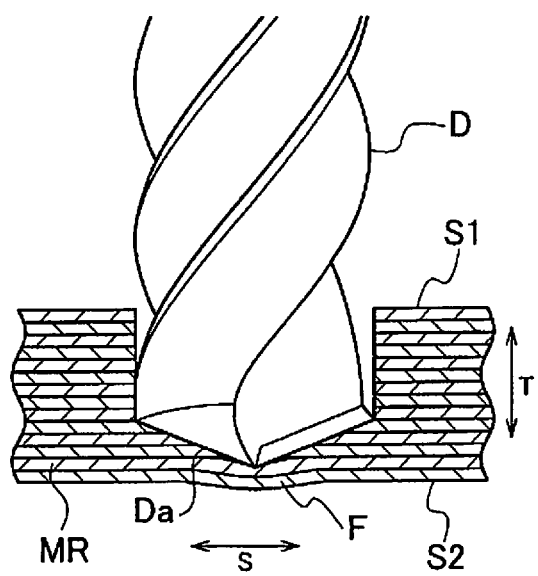
FIG. 3B illustrates a state in which the common FRP member is subjected to the boring process with the drill.

Thereafter, as illustrated in FIG. 3B, when the drill tip Da approaches a surface S2 on the drill exit side and the thickness of the uncut portion of the material decreases, the reinforcing fibers F in the outermost layer of the surface S2 starts to deform so as to protrude outward due to the thrust force of the drill D.

Figure 3C:
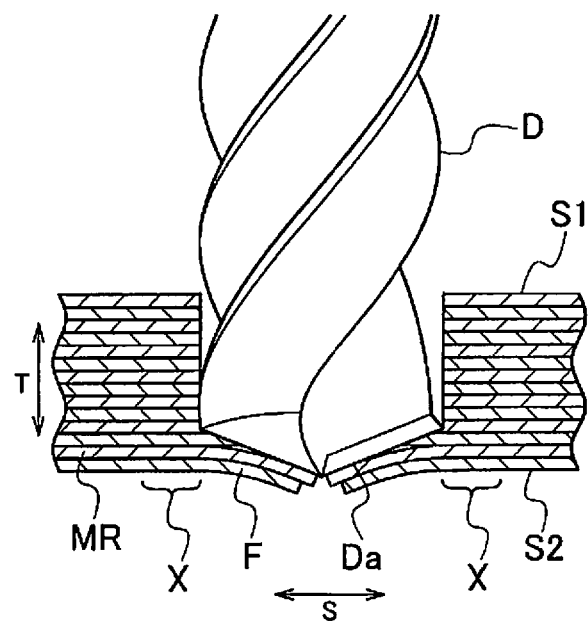
FIG. 3C illustrates a state in which the common FRP member is subjected to the boring process with the drill.
Figure 3D:
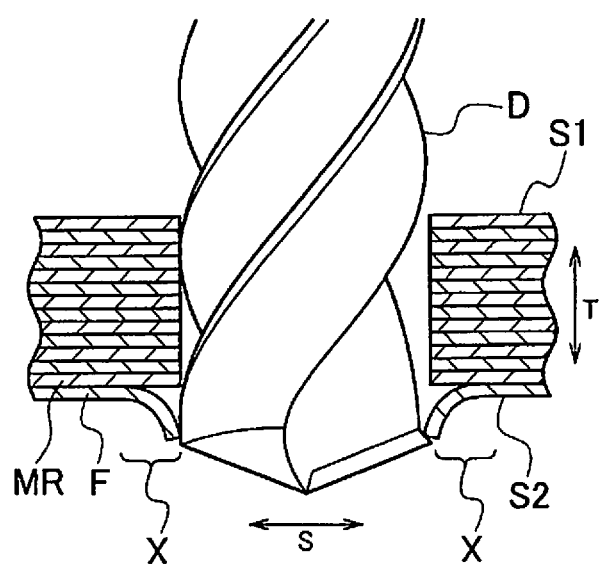
FIG. 3D illustrates a state in which the common FRP member is subjected to the boring process with the drill.

Then, when the drill tip Da tries to exit from the surface S2, as illustrated in FIG. 3C, the uncut portion of the material becomes thinner, and the thrust force of the drill D begins to act on the reinforcing fibers F in the outermost layer of the hole peripheral portion X from the drill tip Da in a direction to peel off the reinforcing fibers F (mainly the thickness direction T). As a result, when the force that is generated between the reinforcing fibers F exceeds the adhesive force between the reinforcing fibers F, peeling of the reinforcing fibers F could occur in the hole peripheral portion X of the surface S2, as illustrated in FIG. 3D.

There are cases in which the cutting force acts on the reinforcing fibers F in the outermost layer of the hole peripheral portion X in a direction to peel off the reinforcing fibers F, even in a boring process using an end mill or a water jet, such that peeling of the reinforcing fibers F or loss of resin could occur, in the same manner as in the boring process by the drill D.

(A) On the other hand, in the member CM according to the present embodiment, the resin-rich layer 2 is formed on the surfaces 1a, 1b of the FRP layer 1, and the hole 3 is bored so as to penetrate the FRP layer 1 and the resin-rich layer 2. That is, during the boring process, the reinforcing fibers F in the outermost layer in the hole peripheral portion 3X of the FRP layer 1 are supported or restrained by the resin-rich layer 2 that is adjacent in the thickness direction T, thereby suppressing the deformation thereof. For this reason, at the time of the boring process, the force acting in the direction of peeling off the reinforcing fibers F in the outermost layer of the hole peripheral portion 3X becomes smaller compared to when the resin-rich layer 2 is not present.

Additionally, since the resin-rich layer 2 has a lower fiber content than the FRP layer 1, at the time of the boring process, the force that is transmitted from a tool to the reinforcing fibers F of the outermost layer via the resin-rich layer 2 becomes smaller compared to when a layer having a higher fiber content than the FRP layer 1 is employed.

Accordingly, by the configuration of the member CM, the occurrence of the peeling of the reinforcing fibers F in the FRP layer 1 and the loss of the resin accompanying the boring process becomes less likely. It is thereby possible to obtain the member CM in which the strength and reliability of the fastening portion FP are high, with little peeling of the reinforcing fibers F and loss of resin, which can cause cracking of the fastening portion FP in the hole peripheral portion 3X.

(B) In addition, in the member CM, since the resin-rich layer 2 is formed on the surfaces 1a, 1b of the FRP layer 1, it is possible to obtain the above-described effect (A) on the surfaces 1a, 1b on both sides of the FRP layer 1. It is thereby possible to obtain the member CM, in which the strength and reliability of the fastening portion FP are high, with less peeling of the reinforcing fibers F and loss of resin in the hole peripheral portion 3X.

(C) Furthermore, in the member CM, since the reinforcing fibers F of the FRP layer 1 are made of continuous fibers, it is possible to further improve the strength and reliability of the fastening portion FP while ensuring the strength and rigidity of the member CM.

(D) Additionally, in the member CM, the upper side resin-rich layer 2 is interposed between the surface 1a of the FRP layer 1 and the rear surface 42a of the flange 42, and the lower side resin-rich layer 2 is interposed between the surface 1b of the FRP layer 1 and the rear surface 5a of the washer 5, respectively prescribing the sizes of the gaps G1, G2. For this reason, it is possible to control the sizes of the gaps G1, G2, that is, the thickness of the adhesive A, by increasing or decreasing the thickness of the resin-rich layer 2, and to stably obtain the adhesive strength.

Without being particularly limiting, in order to more reliably achieve the above-described effects (A) and (B), the thickness of the resin-rich layer 2 is preferably 0.1 mm or more. The thickness is more preferably 0.5 mm or more, and even more preferably 1.0 mm or more.

The thickness of the resin-rich layer 2 is calculated as the difference between a thickness t2 of the resin layer constituting the surface of the resin-rich layer 2 in the hole peripheral portion 3X, and a thickness t1 of the resin layer constituting the surfaces 1a, 1b in the common portion (portion where the resin-rich layer 2 is not formed) of the FRP layer 1. The thicknesses t1, t2 can be calculated by observing, for example, with an electron microscope, a cross section perpendicular to the planar direction S. Here, the thickness t1 is defined as the average value of a prescribed number of measured values of the distance from the surfaces 1a, 1b of the FRP layer 1 to the reinforcing fibers F of the outermost layer. In addition, the thickness t2 is defined as the average value of a prescribed number of measured values of the distance from the surface of the resin-rich layer 2 to the reinforcing fibers F of the outermost layer.

Additionally, while not particularly limited, in order to more reliably achieve the above-described effects (A) and (B), the fiber content of the resin-rich layer 2 is preferably set to 80% or less of the fiber content of the FRP layer 1. The fiber content is more preferably 60% or less of the fiber content of the FRP layer 1, even more preferably 40% or less of the fiber content of the FRP layer 1, still more preferably 20% or less of the fiber content of the FRP layer 1, and most preferably 5% or less of the fiber content of the FRP layer 1.

The fiber content Vf of the resin-rich layer 2 can be calculated from the following formula (1).

$$Vf = 100 \times \text{volume of reinforcing fibers} / (\text{volume of reinforcing fibers} + \text{volume of components other than reinforcing fibers}) \quad (1)$$

Specifically, in an example of a method in which components other than reinforcing fibers are removed from a sample of the resin-rich layer 2, the masses of the reinforcing fibers and the other components are determined; these mass values are converted into volumes using the densities of the respective components; and these volume values are applied to formula (1). Examples of methods for removing components other than reinforcing fibers from the sample include a method of removal by combustion (thermal decomposition), and a method of dissolution and removal by chemical substances. The fiber content Vf of the FRP layer 1 can be calculated in the same manner.

In a modified example of the present embodiment, discontinuous fibers, such as long fibers and short fibers, or a combination of continuous fibers and discontinuous fibers, may be employed as the reinforcing fibers F. Furthermore, in another modified example, part or all of the reinforcing fibers F may be randomly oriented. These modified examples are suitable when the shape of the member CM is complex and high formability is required. In addition, by these modified examples, in addition to the above-described effects (A), (B), and (D), it is possible to achieve the effect of further suppressing the peeling of the reinforcing fibers F with the structure of the reinforcing fibers F itself.

Other Embodiments

Next, the member CM according the second to the fourth embodiments will be described with reference to FIGS. 4A to 6B. Elements having the same functions as the elements already described above are given the same reference symbols, and the explanations thereof are omitted.

In these embodiments, as illustrated in FIGS. 4A to 6B, a first resin-rich layer 21 and a second resin-rich layer 22 are formed as the resin-rich layer 2 in an area of the surface 1a of the FRP layer 1 that is covered by the flange 42. In addition, the first resin-rich layer 21 and the second resin-rich layer 22 as the resin-rich layer 2 are also formed on a region of the surface 1b of the FRP layer 1 that is covered by the washer 5. The hole 3 is bored in the central portion of the first resin-rich layer 21 formed on the surfaces 1a, 1b, and the structure of the hole peripheral portion 3X is the same as that of the first embodiment and the modified examples thereof. Accordingly, the same effects as those of the first embodiment and the modified examples thereof can also be achieved in the second to the fourth embodiments.

Additionally, in the second to the fourth embodiments, the second resin-rich layer 22 is provided farther on the outside of the first resin-rich layer 21 in the radial direction of the hole 3. For this reason, it is possible to more accurately control the sizes of the gaps G1, G2, that is, the thickness of the adhesive A, by controlling the thickness of the second resin-rich layer 22, which is in a position away from the hole 3, and to more stably obtain the adhesive strength of the flange 42, the washer 5, and the like.

Figure 4A:
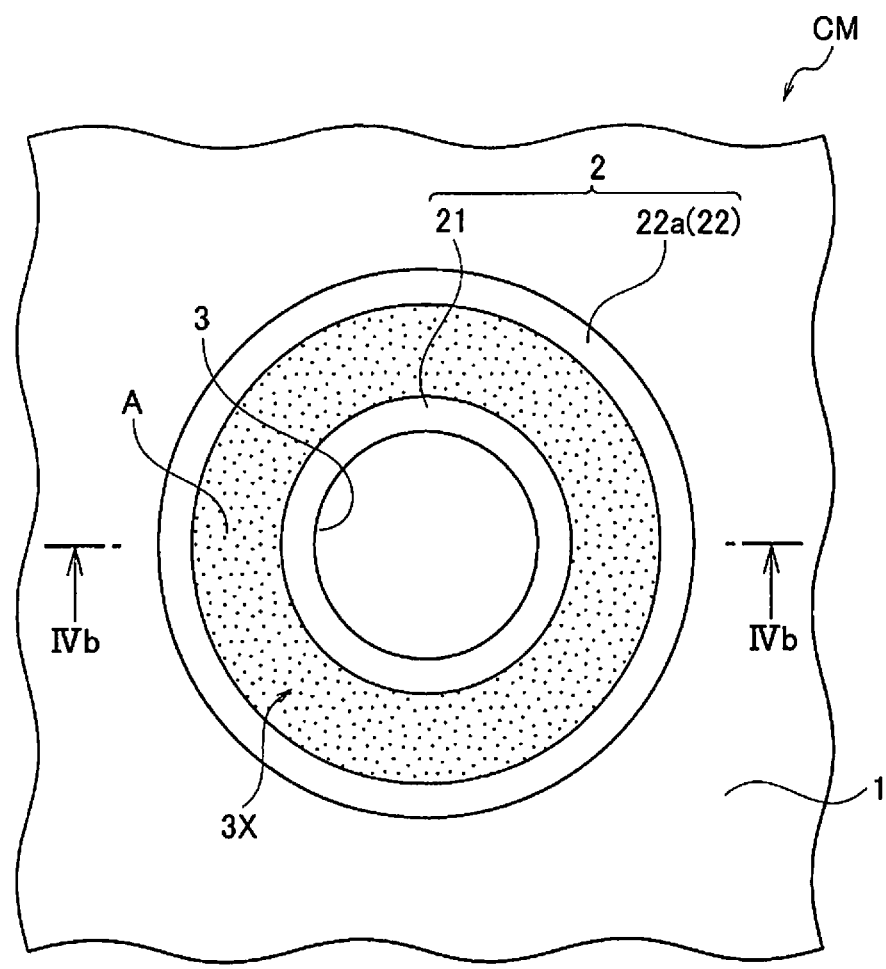
FIG. 4A is a top view of the composite material member according to a second embodiment. The collar and the washer are omitted for the sake of simplicity.
Figure 4B:
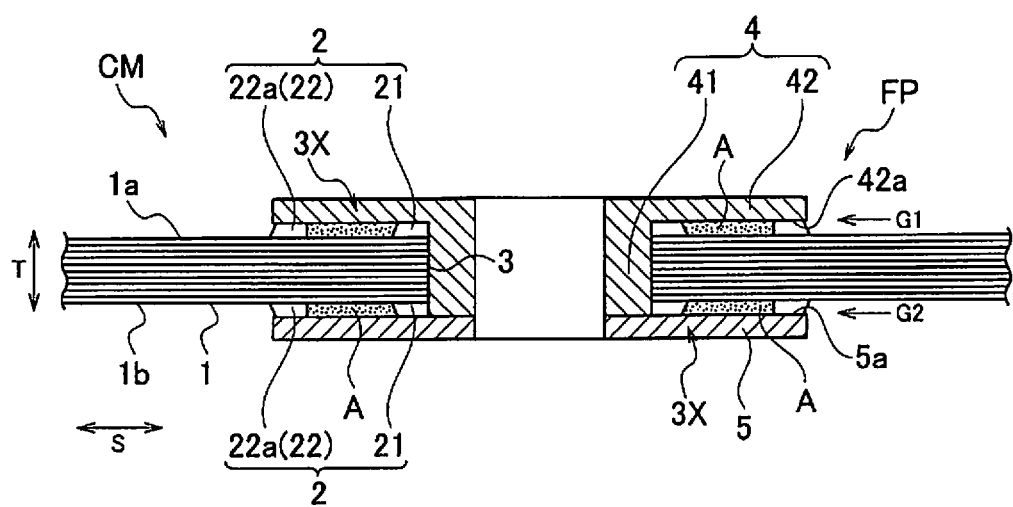
FIG. 4B is a cross-sectional view through line IVb-IVb in FIG. 4A.

In particular, in the second embodiment, as illustrated in FIGS. 4A and 4B, the second resin-rich layer 22 constitutes an annular protrusion 22a, which continuously surrounds the periphery of the first resin-rich layer 21. Accordingly, because it is possible to dam up the adhesive A with the annular protrusion 22a, it is possible to prevent the adhesive A from protruding in the areas outside of the flange 42 and the washer 5 while more accurately controlling the thickness of the adhesive A. The shape of the annular protrusion 22a illustrated in FIGS. 4A and 4B is that of a single ring, but may be a double ring, etc.

Figure 5A:
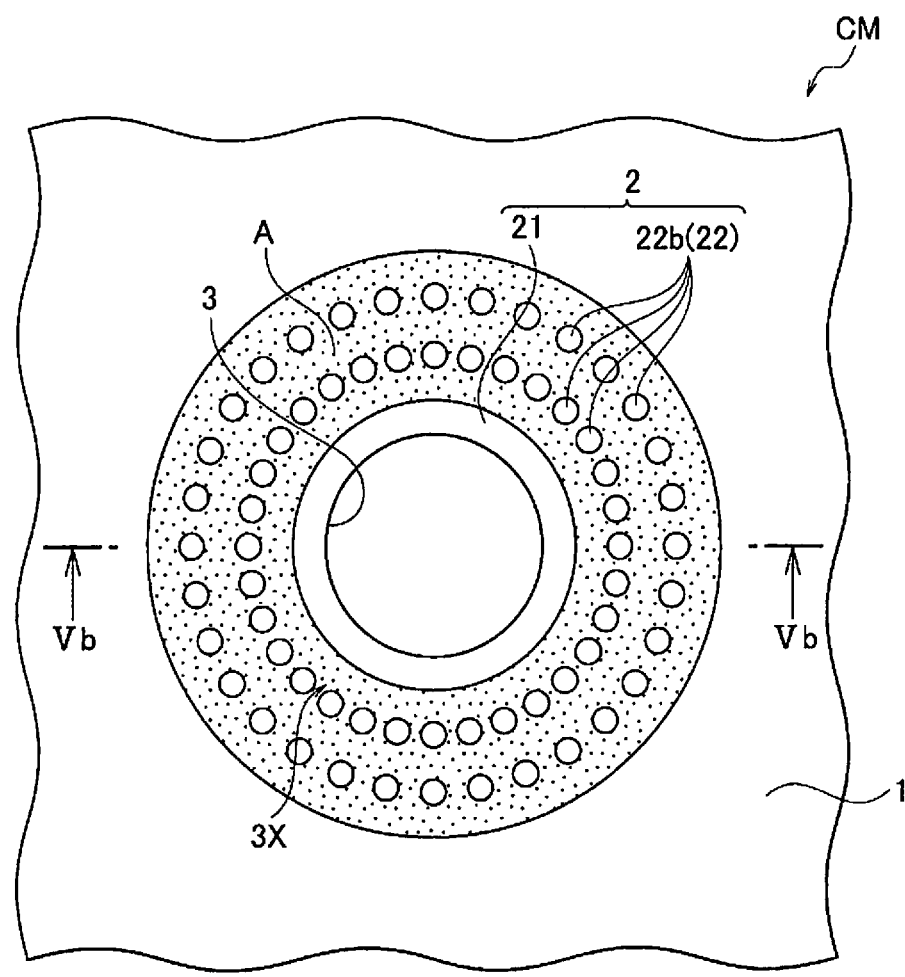
FIG. 5A is a top view of the composite material member according to a third embodiment. The collar and the washer are omitted for the sake of simplicity.
Figure 5B:
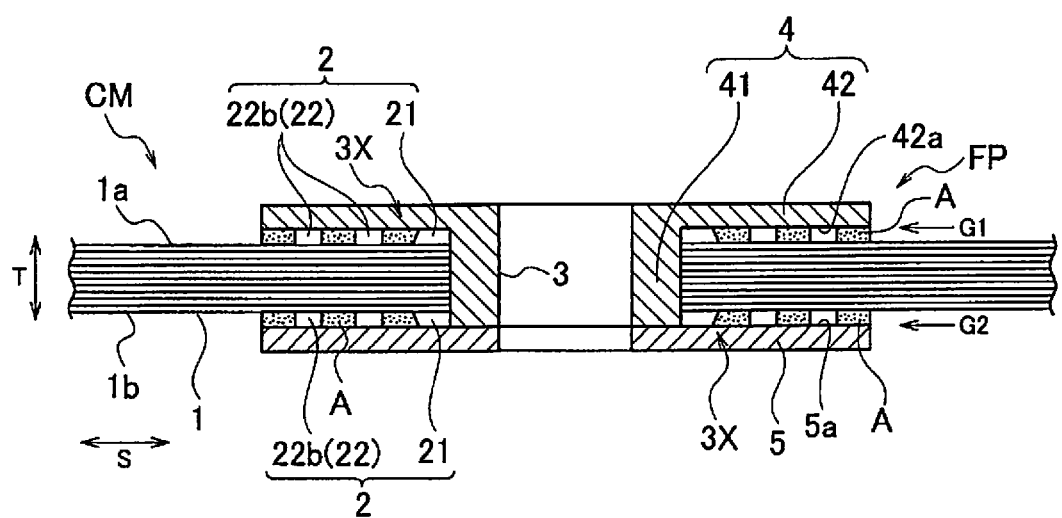
FIG. 5B is a cross-sectional view through line Vb-Vb in FIG. 5A.

In addition, in the third embodiment, as illustrated in FIGS. 5A and 5B, the second resin-rich layer 22 constitutes island-like protrusions 22b which surround the periphery of the first resin-rich layer 21. Accordingly, it is possible to blanket the inside and the outside of the rows of the island-like protrusions 22b with the adhesive A in the radial direction of the hole 3. The plurality of island-like protrusions 22b shown in FIGS. 5A and 5B are arranged in two concentric rows along the circumferential direction, but the number of rows may be one, or three or more, and may be arranged randomly rather than concentrically. In addition, 62 island-like protrusions 22b are formed in FIGS. 5A and 5B, but the number may be 63 or less, or 65 or more. The shape of each island-like protrusion 22b is not particularly limited, and may be circular, elliptical, polygonal, fan-shaped, arcuate, and the like.

Figure 6A:
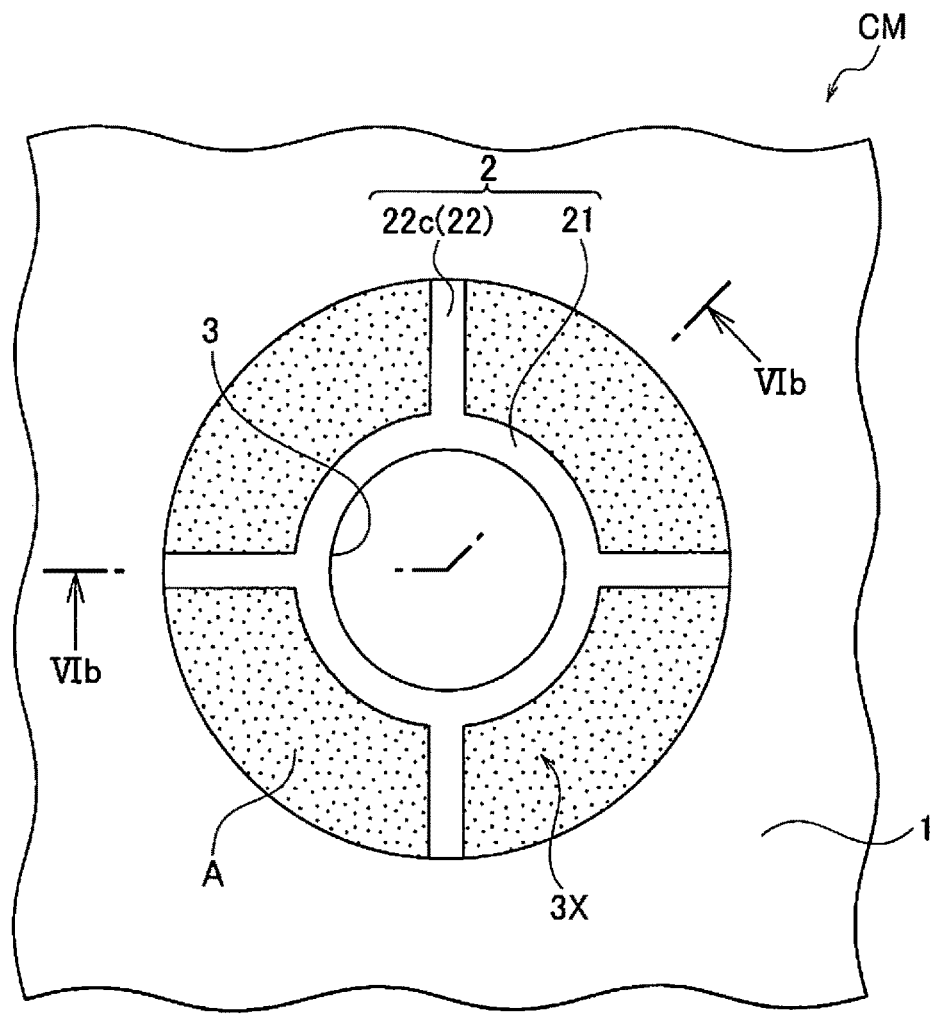
FIG. 6A is a top view of the composite material member according to a fourth embodiment. The collar and the washer are omitted for the sake of simplicity.
Figure 6B:
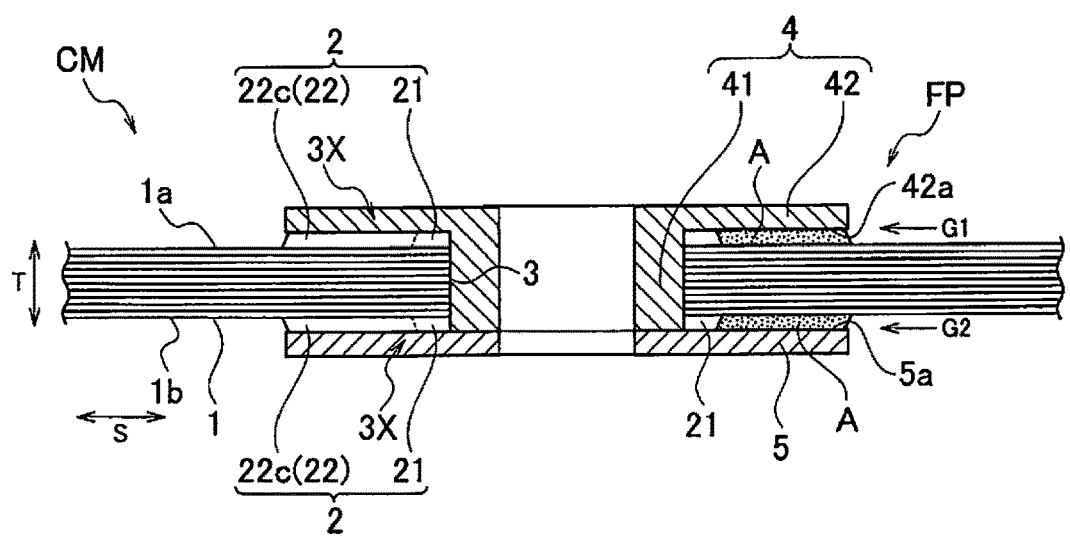
FIG. 6B is a cross-sectional view through line VIb-VIb in FIG. 6A.

Moreover, in the third embodiment, as illustrated in FIGS. 6A and 6B, the second resin-rich layer 22 constitutes linear protrusions 22c, which extend outward from the first resin-rich layer 21 in the radial direction of the hole 3. Since the linear protrusions 22c extend outward from the first resin-rich layer 21, it is possible to more accurately define the attitudes (angles) of the collar 4 and the washer 5 relative to the surfaces 1a, 1b of the FRP layer 1 by controlling the thickness of the linear protrusions 22c. The linear protrusions 22c shown in FIGS. 6A and 6B extend continuously outward from the first resin-rich layer 21, but the linear protrusions 22c may be composed of a plurality of linear protrusions 22c that are disposed discontinuously along the radial direction of the hole 3. In addition, the number of linear protrusions 22c is not particularly limited, and may be three or less, or five or more.

In addition, the annular protrusion 22a, the island-like protrusions 22b, and the linear protrusions 22c of the second to the fourth embodiments may be used in combinations of two or more.

Next, a method for efficiently producing the member CM will be described with reference to FIGS. 7A to 11B.

The method for producing P1 the member CM will be described with reference to FIGS. 7A to 9C.

First, a reinforcing fiber body 1f (reinforcing fiber base material) to be the reinforcing fibers F of the member CM is prepared from reinforcing fibers which have not been impregnated with resin, in a so-called dry state. The reinforcing fiber body 1f is formed by stacking reinforcing fiber bundles in one direction or at different angles and binding the bundles with stitch yarns or by retaining the shape by thermal fusion without using stitch yarns, or from a woven fabric of reinforcing fibers, etc. The reinforcing fibers constituting the reinforcing fiber body 1f may be continuous reinforcing fibers, discontinuous reinforcing fibers, or a combination thereof.

Figure 7A:
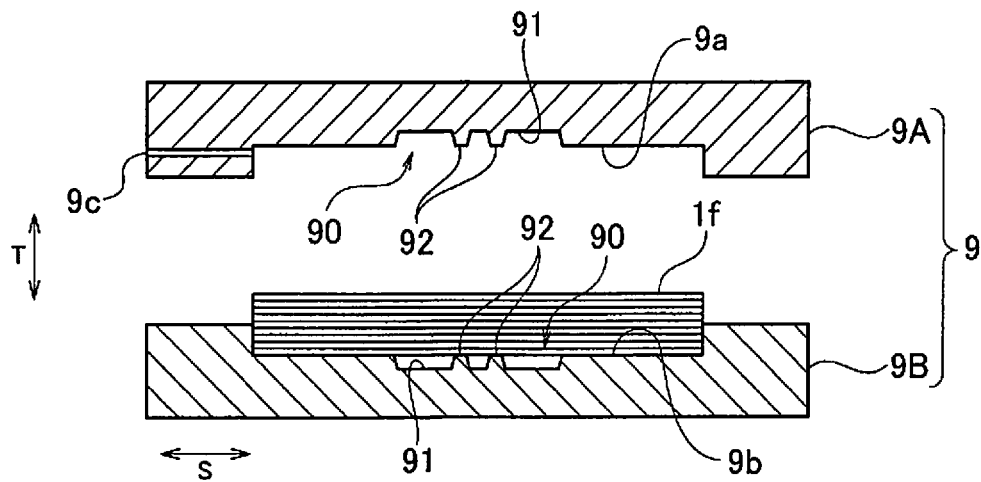
FIG. 7A is a view for explaining a method for producing the composite material member.

Next, as illustrated in FIG. 7A, the reinforcing fiber body 1f is set inside a molding die 9. The molding die 9 is for molding the member CM and has an upper die 9A and a lower die 9B. The upper die 9A has a molding surface 9a that forms the upper side surface of the member CM, and the lower die 9B has a molding surface 9b that forms the lower side surface of the member CM.

Figure 7C:
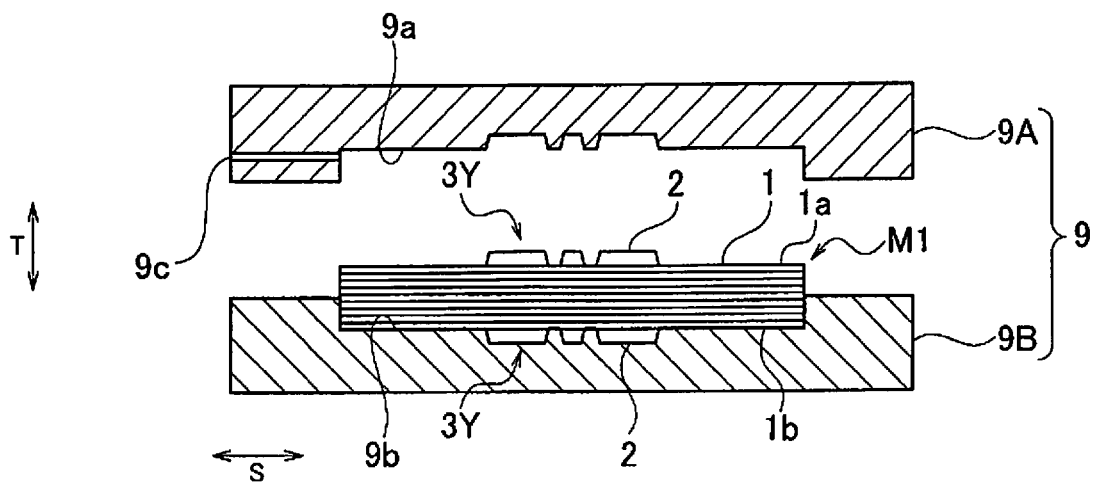
FIG. 7C is a view for explaining the method for producing the composite material member.
Figure 8A:
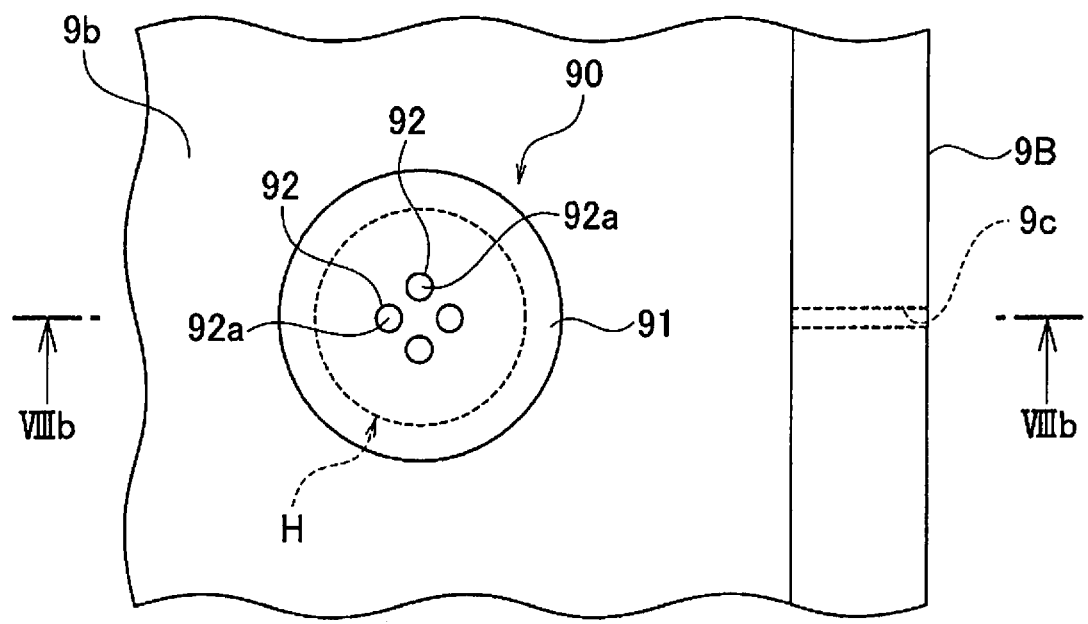
FIG. 8A is an enlarged view of a main portion of a molding die of the composite material member.
Figure 8B:
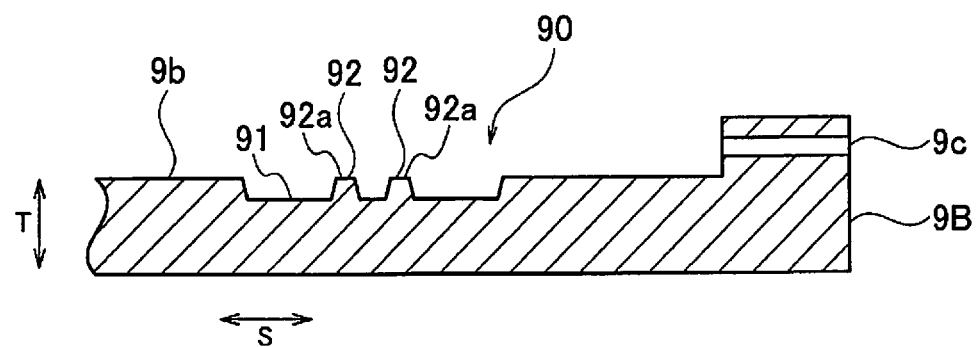
FIG. 8B is a cross-sectional view through line VIIIb-VIIIb in FIG. 8A.

As illustrated in FIGS. 8A and 8B, the molding surface 9b of the lower die 9B has a recess 90. The recess 90 is formed in an area of the molding surface 9b that corresponds to a portion to be bored 3Y (refer to FIGS. 7C, 9A, etc.). The portion to be bored 3Y means a portion where the hole 3 is to be bored on a member, such as molded bodies M1, M2 and adhesive structure M3, described further below, before the hole 3 is formed. The recess 90 of the lower die 9B constitutes a portion of the molding surface 9b and forms the resin-rich layer 2 on the surface 1b of the FRP layer 1. On a bottom surface 91 of the recess 90 are formed four protrusions 92 that protrude upward from the bottom surface 91 and that support the lower surface of the reinforcing fiber body 1f away from the bottom surface 91. In addition, as illustrated in FIG. 7A, the recess 90 is also formed in an area of the molding surface 9a of the upper die 9A that corresponds to the portion to be bored 3Y. The recess 90 of the upper die 9A constitutes a portion of the molding surface 9a and forms the resin-rich layer 2 on the surface 1a of the FRP layer 1. On the bottom surface 91 of the recess 90 are formed four protrusions 92 that protrude downward from the bottom surface 91 and that support the upper surface of the reinforcing fiber body 1f away from the bottom surface 91. The height of each protrusion 92 is set such that the height of a distal end surface 92a thereof matches the heights of the molding surfaces 9a, 9b in the periphery of the recess 90. The broken line circle in FIG. 8A indicates the position of the hole 3 provided in the member CM. As illustrated in FIG. 8A, the recess 90 is formed and disposed so as to include the area of the broken line circle (hereinafter also referred to as hole area H) therein. The shape of the recess 90 is not limited to that which is illustrated, and can be appropriately selected in accordance with the shape of the resin-rich layer 2 to be formed.

Figure 7B:
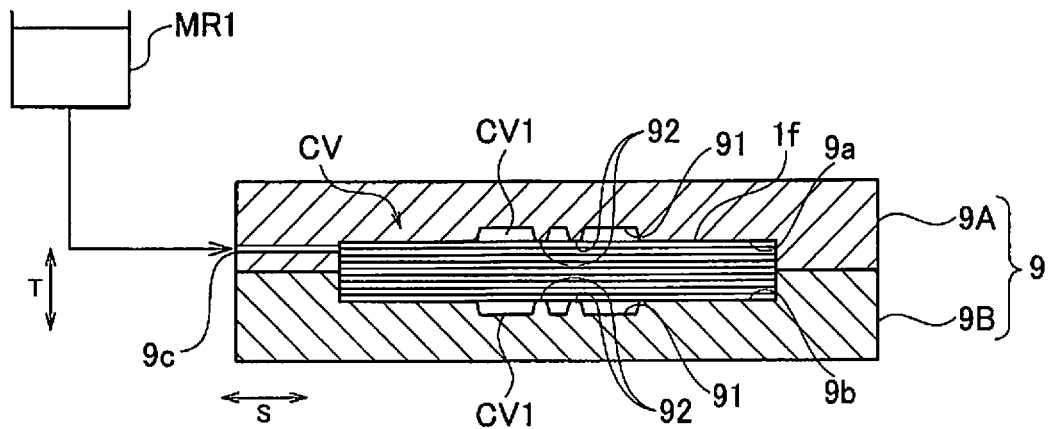
FIG. 7B is a view for explaining the method for producing the composite material member.

Next, as illustrated in FIG. 7B, the molding die 9 is closed and the reinforcing fiber body 1f is enclosed inside the molding die 9. When the molding die 9 is closed, a molding space (cavity) CV closed by the molding surface 9a and the molding surface 9b is defined, and the recess 90 of the molding surface 9a and the recess 90 of the molding surface 9b are disposed opposite each other in the thickness direction T. Except for the recess 90, the molding surface 9a abuts the upper surface of the reinforcing fiber body 1f, and, except for the recess 90, the molding surface 9b abuts the lower surface of the reinforcing fiber body 1f. In each recess 90, the distal end surface 92a of the protrusion 92 abuts the upper surface or the lower surface of the reinforcing fiber body 1f. Then, a gap CV1 is formed between the bottom surface 91 and the reinforcing fiber body 1f, which is held away from the bottom surface 91 by the protrusions 92. In this state, molten resin MR1 is poured into the cavity CV from a resin injection port 9c provided in the molding die 9. During this time, the reinforcing fiber body 1f, which is enclosed in the die, is held away from the bottom surface 91, which is a portion of the molding surfaces 9a, 9b, by the protrusions 92. The injected resin MR1 spreads throughout the interior of the gap CV1 formed between the reinforcing fiber body 1f and the bottom surface 91, impregnates the spaces between the reinforcing fibers F constituting the reinforcing fiber body 1f, and spreads out across the entire area of the reinforcing fiber body 1f. The fluid pressure, the fluid temperature, the injection rate, etc., at the time of injection can be determined based on the recommended molding conditions of the resin MR1 to be used and can be appropriately adjusted in accordance with the dimensions, etc., of the member CM. For example, if an epoxy resin is employed, the fluid pressure may be set to 7-20 MPa and the fluid temperature may be set to 40-80° C.

Thereafter, the resin MR1 injected in the cavity CV is cured by pressurizing and heating the reinforcing fiber body 1f at the curing temperature (for example, 120-130° C.) of the resin MR1 with the upper die 9A and the lower die 9B. After the resin is cured, the resin MR1 injected into the reinforcing fiber body 1f is integrated with the reinforcing fiber body 1f and becomes the matrix resin MR of the FRP layer 1, and the reinforcing fiber body 1f becomes the reinforcing fibers F of the FRP layer 1. The resin MR1 injected in the gap CV1 becomes the resin-rich layer 2 after curing. Then, as illustrated in FIG. 7C, the die is opened, and the formed molded body M1 (composite material molded body) is removed from the molding die 9.

Figure 9A:
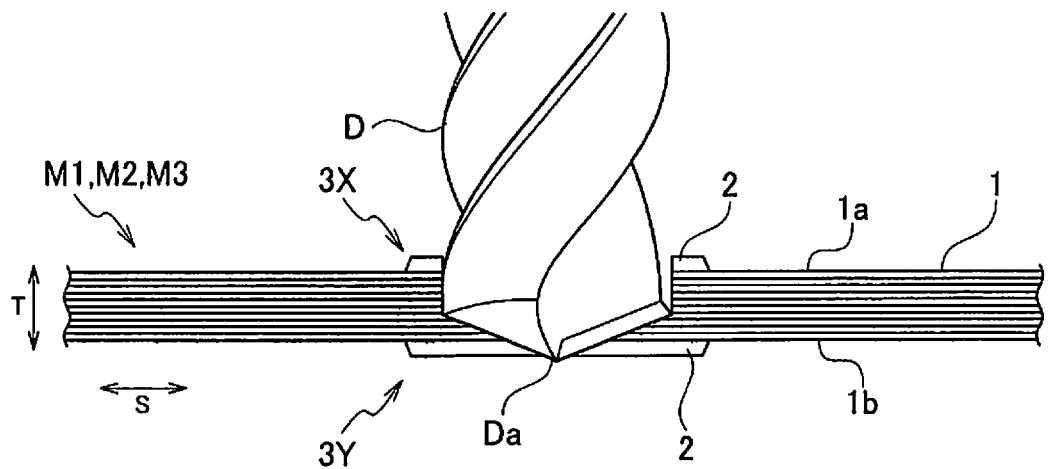
FIG. 9A is a view for explaining the method for producing the composite material member.

Next, as illustrated in FIG. 9A, the hole 3 is bored in the portion to be bored 3Y of the molded body M1 by the drill D. Here, the hole 3 is bored so as to penetrate the FRP layer 1 and the resin-rich layers 2 formed on the surfaces on both sides thereof.

Figure 9B:
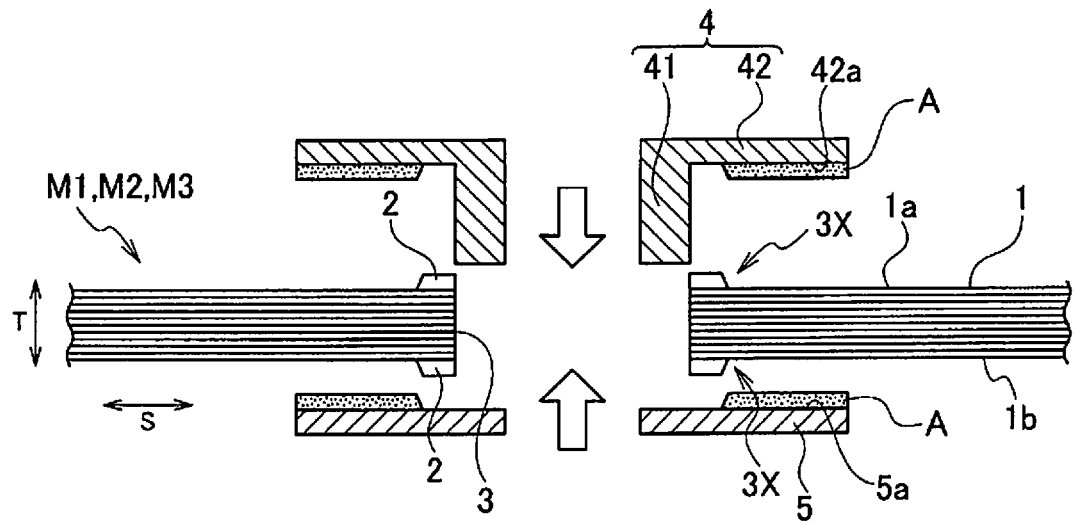
FIG. 9B is a view for explaining the method for producing the composite material member.
Figure 9C:
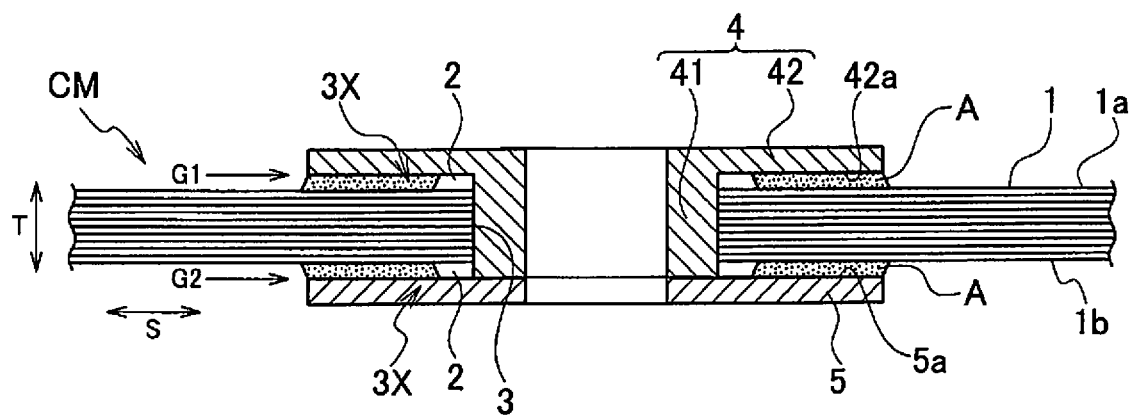
FIG. 9C is a view for explaining the method for producing the composite material member.

Next, as illustrated in FIG. 9B, the adhesive A is applied to the adhesive surface of the rear surface 42a of the flange 42 of the collar 4 with respect to the surface 1a of the FRP layer 1. Then, the tubular portion 41 of the collar 4 is inserted into the hole 3, and the rear surface 42a of the flange 42 is abutted against the surface of the resin-rich layer 2 formed in the hole peripheral portion 3X of the surface 1a of the FRP layer 1. In addition, the adhesive A is applied to the adhesive surface of the rear surface 5a of the washer 5 with respect to the surface 1b of the FRP layer 1. Then, the rear surface 5a of the washer 5 is abutted against the surface of the resin-rich layer 2 formed in the hole peripheral portion 3X of the surface 1b of the FRP layer As a result, as illustrated in FIG. 9C, the gap G1 formed between the rear surface 42a of the flange 42 and the surface 1a of the FRP layer 1 is filled with the adhesive A in the region outside of the resin-rich layer 2 in the radial direction of the hole 3. In addition, the gap G2 formed between the rear surface 5a of the washer 5 and the surface 1b of the FRP layer 1 is filled with the adhesive A in the region outside of the resin-rich layer 2 in the radial direction of the hole 3. The adhesive A is used to bond the rear surface 42a of the flange 42 to the surface 1a of the FRP layer 1, and the rear surface 5a of the washer 5 to the surface 1b of the FRP layer 1. In addition, the thickness of each gap G1, G2 is defined by the thickness of the resin-rich layer 2.

As described above, in the production method P1, the reinforcing fiber body 1f is enclosed in the molding die 9, and the molten resin MR1 is injected in the reinforcing fiber body 1f. Since it is thereby possible to precisely form the target shape by the molding surfaces 9a, 9b of the molding die 9, it is possible to efficiently produce a member CM that has a complex surface shape.

Additionally, the protrusions 92 are formed in areas of the upper die 9A and the lower die 9B that correspond to the portions to be bored 3Y, and the protrusions 92 hold the reinforcing fiber body 1f away from the bottom surface 91 of the recess 90 by a prescribed distance, while the resin MR1 spreads throughout the interior of the cavity CV. It is thereby possible to form on the surface layer of the portion to be bored 3Y the resin-rich layer 2 having a lower fiber content than the FRP layer 1 at a height corresponding to the protrusions 92. In addition, when the resin MR1 is injected, it is possible to suppress floating (meandering) of the fibers of the reinforcing fiber body 1f in the portion to be bored 3Y by pressing the fibers with the protrusions 92. It is thereby possible to improve the strength of the fastening portion FP of the member CM.

Although four of the protrusions 92 illustrated in FIGS. 8A and 8B are formed on the bottom surface 91 of the recess 90, the number of the protrusions 92 is not particularly limited, and may be three or less or five or more for each of the portion to be bored 3Y. The shape of each of the protrusion 92 is not limited to that of a cylinder, and may be that of a polygonal pillar, a truncated cone, a truncated pyramid, plate-like, etc. Additionally, the protrusions 92 illustrated in FIGS. 8A and 8B are provided inside the hole area H, but may be provided in the area outside of the hole area H. Recesses formed on the resin-rich layer 2 with the protrusions 92 provided in the area outside of the hole area H can be used, for example, for filling with the adhesive A.

Next, another method for producing P2 the member CM will be described with reference to FIGS. 10A to 10C. Members having the same functions as the members already described above are given the same reference symbols, and the explanations thereof are omitted.

First, a prepreg 1p (first sheet-like molding material) in which a reinforcing fiber base material, which becomes the reinforcing fibers F of the member CM, is impregnated with resin, and a resin-rich sheet 2p (second sheet-like molding material), which has a lower fiber content than the prepreg 1p, are produced. The material of the prepreg 1p is selected from materials to be the FRP layer 1 after the curing of the resin, and the material of the resin-rich sheet 2p is selected from materials to be the resin-rich sheet 2p after the curing of the resin.

Figure 10A:
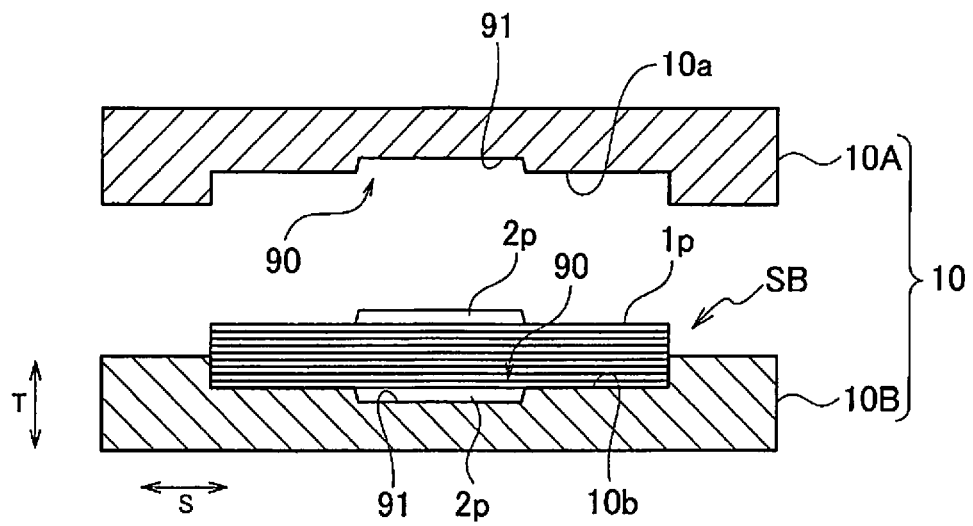
FIG. 10A is a view for explaining another method for producing the composite material member.

Next, as illustrated in FIG. 10A, the resin-rich sheet 2p, which has been cut to a prescribed shape, is superposed and disposed on the upper side and lower side surfaces of the prepreg 1p, which has been cut to a prescribed shape to form a stacked body SB, which is set inside a molding die 10. An upper die 10A has a molding surface 10a that forms the upper side surface of the member CM, and a lower die 10B has a molding surface 10b that forms the lower side surface of the member CM. The recess 90 for forming the resin-rich layer 2 is formed in the areas of the two molding surfaces 10a, 10b, corresponding to the portion to be bored 3Y.

Figure 10B:
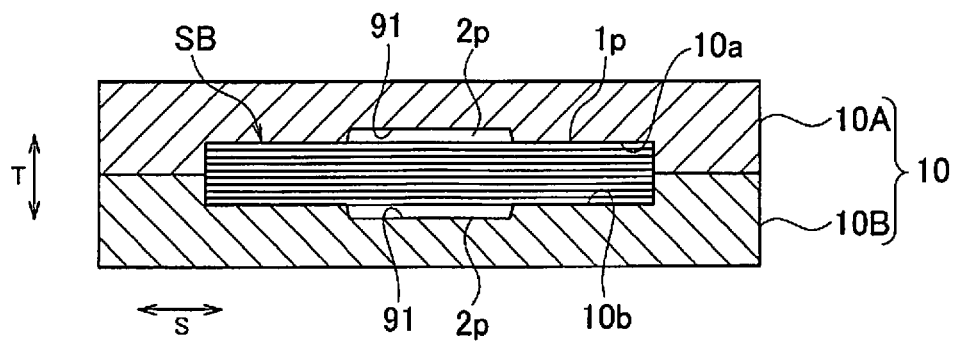
FIG. 10B is a view for explaining another method for producing the composite material member.
Figure 10C:
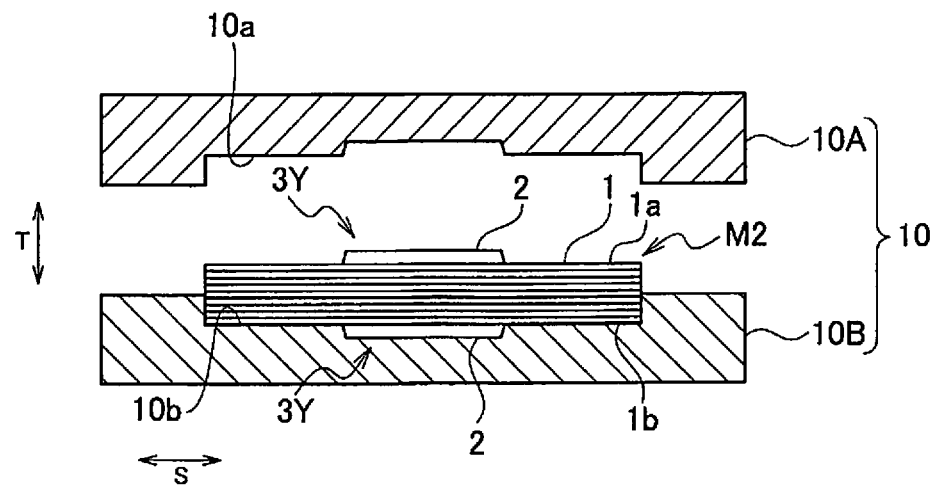
FIG. 10C is a view for explaining another method for producing the composite material member.

Next, as illustrated in FIG. 10B, the molding die 10 is closed and the stacked body SB is pressurized and heated at the curing temperature of the resin with the upper die 10A and the lower die 10B, to thereby cure the resin of the resin-rich sheet 2p and the prepreg 1p, which are integrally molded. After the curing of the resin, the prepreg 1p becomes the FRP layer 1 and the resin-rich sheet 2p becomes the resin-rich layer 2. Then, as illustrated in FIG. 10C, the die is opened, and the formed molded body M2 is removed from the molding die 10.

Thereafter, the hole 3 is bored so as to penetrate the FRP layer 1 made of the cured prepreg 1p and the resin-rich layer 2 made of the cured resin-rich sheet 2p, and the collar 4 and the washer 5 are attached to the hole 3. The step for boring the hole 3 and the step for attaching the collar 4, and the like, are the same as the steps in the production method P1 described with reference to FIGS. 9A to 9C, so that the description thereof is omitted here.

As described above, in the production method P2, the resin-rich sheet 2p is superposed on the surface of the prepreg 1p, which are then pressure-molded by the molding die 10. In the production method P2, since the molten resin is not injected into the molding die 10, floating of the reinforcing fibers F does not occur in the portion to be bored 3Y. It is thereby possible to improve the strength of the fastening portion FP of the member CM.

Next, another method for producing P3 the member CM will be described with reference to FIGS. 11A to 11B. Members having the same functions as the members already described above are assigned the same reference symbols, and the explanations thereof are omitted.

First, an FRP member 1m made of fiber-reinforced plastic and a resin-rich sheet member 2m (sheet member) having a lower fiber content than the FRP member 1m, are produced. The FRP member 1m can be made of the same material as the material of the FRP layer 1 of the member CM, and the resin-rich sheet member 2m can be made of the same material as the material of the resin-rich layer 2 of the member CM.

Figure 11A:
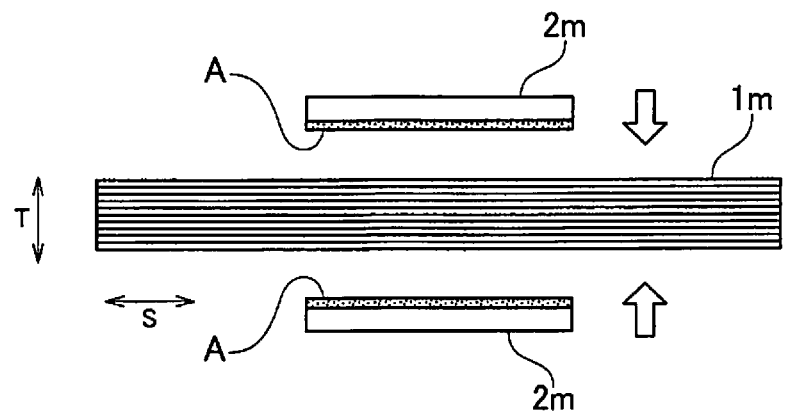
FIG. 11A is a view for explaining another method for producing the composite material member.
Figure 11B:
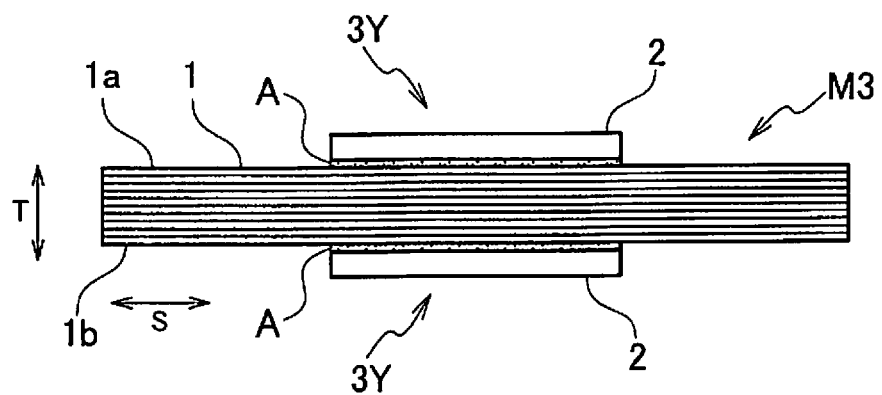
FIG. 11B is a view for explaining another method for producing the composite material member.

Next, as illustrated in FIG. 11A, the adhesive A is applied to the rear surface of the resin-rich sheet member 2m that has a prescribed shape, which is bonded on the upper side and lower side surfaces of the FRP member 1m that has a prescribed shape. An integrated bonded structure M3 is thereby obtained, as illustrated in FIG. 11B. In the bonded structure M3, the FRP member 1m constitutes the FRP layer 1 and the resin-rich sheet member 2m constitutes the resin-rich layer 2.

Thereafter, with respect to the bonded structure M3, the hole 3 is bored so as to penetrate the FRP member 1m and the resin-rich sheet member 2m, and the collar 4 and the washer 5 are attached to the hole 3. The step for boring the hole 3 and the step for attaching the collar 4, and the like, are the same as the steps in the production method P1 described with reference to FIGS. 9A to 9C, so that the description thereof is omitted here.

As described above, in the production method P3, since the hole 3 is formed in the bonded structure M3 obtained by adhering the resin-rich sheet member 2m on the surface of the FRP member 1m, molding using a molding die is not necessary, so that the number of steps is smaller than a method that uses a molding die, and thus the productivity is good.

Additionally, in the production method P3, since the molten resin is not injected into the reinforcing fiber base material, meandering of the reinforcing fibers F does not occur in the portion to be bored 3Y, and it is possible to improve the strength of the fastening portion FP of the member CM, in the same manner as the production method P2.

Other than the production methods P1-P3 described above, it is also possible to employ an autoclave method, an SMC method, a hand lay-up method, a spray-up method, or the like, as the method for producing the member CM.

Several embodiments were described above, but these embodiments are merely examples described in order to facilitate comprehension of the invention. The technical scope of the invention is not limited to the specific technical matters disclosed in the above-described embodiments and modified examples, and includes various modifications, changes, and alternatives that can be easily derived therefrom.

For example, in the above-described embodiments and modified examples, the FRP layer 1 is composed of fiber-reinforced plastic, but in order to increase the rigidity of the member CM, the FRP layer 1 may also include one or more core material made of other materials (for example, resin foam) as an intermediate layer. In addition, for example, a skin material for decoration may be provided on the surfaces 1a, 1b of the FRP layer 1.

Additionally, in the above-described embodiments and the modified examples, the resin-rich layer 2 is formed in the areas of the surface of the FRP layer 1 covered by the flange 42 and the washer 5, but the resin-rich layer 2 may be formed over a wider range, such as an area that includes the entire fastening portion FP.

Furthermore, in the above-described embodiments and the modified examples, the resin-rich layer 2 is formed on the surfaces 1a, 1b on both sides of the FRP layer 1, but the resin-rich layer 2 may be formed only on the surface 1a or 1b on one side of the FRP layer 1. Additionally, the cross-sectional shape of the hole 3 is not limited to a circle, and may be an oval, a rectangle, or the like.

The composite material member CM can be applied to components of vehicles such as automobiles, for example, hoods, door panels, bumpers, trunk lids, rear gates, fender panels, side body panels, and roof panels. In addition, the composite material member CM can be utilized as component members of transport vehicles, such as aircraft, ships, railcars, etc., domestic electric appliances, power generation facilities, production machines, housing equipment, furniture, leisure goods, or etc.

The invention claimed is:

1. A composite material member comprising:
   an FRP layer made of fiber-reinforced plastic;
   a resin-rich layer that has a fiber content that is greater than zero and less than or equal to 5% of the fiber content of the FRP layer, that is formed in at least a partial region of a surface of the FRP layer, and that is formed from the same resin as a matrix resin of the fiber-reinforced plastic; and
   a hole that is bored so as to penetrate the FRP layer and the resin-rich layer.

2. The composite material member according to claim 1, wherein
   the resin-rich layer is formed on surfaces on both sides of the FRP layer, and
   the hole penetrates the FRP layer and the resin-rich layers formed on the surfaces on both sides of the FRP layer.

3. The composite material member according to claim 1, wherein
   the reinforcing fibers of the FRP layer is made of continuous fibers.

4. The composite material member according to claim 1, wherein
   a thickness of the resin-rich layer is at least 0.5 mm.

* * * * *